(12) United States Patent
Qu et al.

(10) Patent No.: US 12,340,769 B2
(45) Date of Patent: Jun. 24, 2025

(54) BACKLIGHT MODULE AND DRIVING METHOD THEREOF, AND DISPLAYING MODULE

(71) Applicants: Beijing BOE Display Technology Co., Ltd., Beijing (CN); BOE Technology Group Co., Ltd., Beijing (CN)

(72) Inventors: Guojian Qu, Beijing (CN); Yangyang Cai, Beijing (CN); Qiaoke Zhou, Beijing (CN); Yawei Chen, Beijing (CN); Jing Wang, Beijing (CN); Tanhong Zhao, Beijing (CN); Gang Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,920

(22) PCT Filed: Mar. 31, 2022

(86) PCT No.: PCT/CN2022/084527
§ 371 (c)(1),
(2) Date: Feb. 17, 2023

(87) PCT Pub. No.: WO2023/184387
PCT Pub. Date: Oct. 5, 2023

(65) Prior Publication Data
US 2024/0274097 A1     Aug. 15, 2024

(51) Int. Cl.
*G09G 3/34* (2006.01)
*F21V 8/00* (2006.01)
*G02F 1/13357* (2006.01)

(52) U.S. Cl.
CPC ........ *G09G 3/3426* (2013.01); *G02B 6/0068* (2013.01); *G02F 1/133609* (2013.01);
(Continued)

(58) Field of Classification Search
CPC .... G09G 3/3426; G09G 3/3413; G09G 3/342; G09G 2320/0242; G09G 2320/041; G02B 6/0068; G02F 1/133609; G02F 1/133603
See application file for complete search history.

(56) References Cited

U.S. PATENT DOCUMENTS

2008/0025029 A1*  1/2008  Hou .................. G02F 1/133603
                                                                362/308
2009/0168431 A1*  7/2009  Hsu ...................... G02B 6/0085
                                                                362/294
(Continued)

FOREIGN PATENT DOCUMENTS

CN         102376271 A       3/2012
CN         103889101 A       6/2014
(Continued)

*Primary Examiner* — Temesghen Ghebretinsae
*Assistant Examiner* — Karin Kiyabu
(74) *Attorney, Agent, or Firm* — WHDA, LLP

(57) ABSTRACT

A backlight module includes a backlight source and a backlight driving unit. The backlight source includes a white-light source and a compensating light source. The backlight driving unit includes a primary driving module and a compensating driving module. The primary driving module, within a compensation time duration, according to a current environmental temperature, selects a compensation-driving function corresponding to the current environmental temperature; and according to the selected compensation-driving function, supplies a compensation controlling signal to the compensating driving module. The compensating driving module acquires the compensation controlling signal, and according to the compensation controlling signal, supplies a driving signal to the compensating light source.

(Continued)

The compensating light source acquires the driving signal, and emits light when driven by the driving signal, whereby a variation value of a white-dot chromaticity coordinate of the displaying module within the compensation time duration is within a preset range.

19 Claims, 10 Drawing Sheets

(52) U.S. Cl.
CPC ........... *G09G 3/3413* (2013.01); *G09G 3/342* (2013.01); *G02F 1/133603* (2013.01); *G09G 2320/0242* (2013.01); *G09G 2320/041* (2013.01)

(56) References Cited

U.S. PATENT DOCUMENTS

2010/0277410 A1 11/2010 You et al.
2018/0246377 A1 8/2018 Fan

FOREIGN PATENT DOCUMENTS

| CN | 106597753 A | 4/2017 |
| CN | 106652938 A | 5/2017 |
| CN | 113015298 A | 6/2021 |
| JP | 2007134194 A | 5/2007 |

* cited by examiner

| CBLED | x | y | CRLED | x | y | CGLED | x | y |
|---|---|---|---|---|---|---|---|---|
| 0 | 0.2985 | 0.3349 | 0 | 0.2985 | 0.3349 | 0 | 0.2985 | 0.3349 |
| 1%B | 0.2978 | 0.3336 | 1%R | 0.2996 | 0.3348 | 1%G | 0.2979 | 0.3368 |
| 2%B | 0.2972 | 0.3323 | 2%R | 0.3008 | 0.3347 | 2%G | 0.2973 | 0.3386 |
| 3%B | 0.2966 | 0.3311 | 3%R | 0.302 | 0.3346 | 3%G | 0.2967 | 0.3405 |
| 4%B | 0.296 | 0.3298 | 4%R | 0.3032 | 0.3345 | 4%G | 0.2961 | 0.3423 |
| 5%B | 0.2954 | 0.3285 | 5%R | 0.3043 | 0.3344 | 5%G | 0.2956 | 0.3441 |
| 6%B | 0.2948 | 0.3273 | 6%R | 0.3055 | 0.3343 | 6%G | 0.295 | 0.3459 |
| 7%B | 0.2942 | 0.3261 | 7%R | 0.3066 | 0.3342 | 7%G | 0.2945 | 0.3476 |

BACKLIGHT MODULE AND DRIVING METHOD THEREOF, AND DISPLAYING MODULE

TECHNICAL FIELD

The present application relates to the technical field of displaying, and particularly relates to a backlight module and a driving method thereof, and a displaying module.

BACKGROUND

Professional liquid-crystal displaying modules used for medical treatment, video production, electronic scutcheons and so on usually have the characteristics of a high brightness and a high colour gamut. Based on the characteristic of the high colour gamut, the color film has a high thickness, and the panel has a low transmittance. Therefore, the backlight brightness of the liquid-crystal modules is required to be increased to satisfy the requirement on the high brightness. However, the increasing of the backlight brightness requires increasing the quantity of the LEDs (Light Emitting Diode) and increasing the LED driving current, which inevitably causes the problem of heat generation of the modules. The displaying modules, in a normal-temperature environment, usually require a duration of 30-60 minutes before the temperature is stable, and, during the temperature rise, chromaticity deviation of the modules happens (which is mainly expressed in the white frame), which deteriorates the displaying quality.

SUMMARY

The embodiments of the present application employ the following technical solutions:

In an aspect, there is provided a backlight module, wherein the backlight module is applied to a displaying module;

the backlight module comprises a backlight source and a backlight driving unit;

the backlight source comprises a white-light source and a compensating light source, an exiting-light-wavelength range of the white-light source is a first wavelength range, and an exiting-light-wavelength range of the compensating light source is a second wavelength range, wherein the second wavelength range is within the first wavelength range;

the backlight driving unit comprises a primary driving module and a compensating driving module;

the primary driving module is electrically connected to the white-light source and the compensating driving module, and is configured for, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures; and according to the selected compensation-driving function, supplying a compensation controlling signal to the compensating driving module;

the compensating driving module is configured for acquiring the compensation controlling signal, and according to the compensation controlling signal, supplying a driving signal to the compensating light source; and the compensating light source is configured for acquiring the driving signal, and emitting light when driven by the driving signal, whereby a variation value of a white-dot chromaticity coordinate of the displaying module within the compensation time duration is within a preset range.

Optionally, a working efficiency q of the compensating light source satisfies:

$$\eta = 100\% * \left(1 - \frac{t}{T_w} * A\right), t \leq T_w$$
$$\eta = 0, t > T_w$$

wherein t represents a duration, Tw is a thermal-equilibrium duration of the displaying module, and A is a module impact factor.

Optionally, the compensating light source comprises a blue-light source; or the compensating light source comprises a blue-light source and a red-light source; or the compensating light source comprises a red-light source, a green-light source and a blue-light source.

Optionally, the compensating light source comprises a blue-light source; and a white-dot chromaticity coordinate (x,y) of the displaying module within the compensation time duration when the white-light source and the compensating light source are started up and a white-dot chromaticity coordinate $(x_0,y_0)$ of the displaying module within the compensation time duration when the white-light source is started up and the compensating light source is not started up satisfy:

$$x = x_0 + \emptyset_B * \delta_B$$
$$y = y_0 + \emptyset_B * \sigma_B$$

wherein $\emptyset_B$ is a ratio of an intensity of the blue-light source to an intensity of the white-light source, $\delta_B$ is an impact factor of a blue light to an x chromaticity coordinate, and GB is an impact factor of a blue light to a y chromaticity coordinate.

Optionally, $0 \leq \emptyset_B \leq 10\%$;
$-0.08 \leq \delta_B \leq -0.01$; and
$-0.2 \leq \sigma_B \leq -0.07$.

Optionally, the compensating light source comprises a blue-light source and a red-light source; and a white-dot chromaticity coordinate (x,y) of the displaying module within the compensation time duration when the white-light source and the compensating light source are started up and a white-dot chromaticity coordinate $(x_0,y_0)$ of the displaying module within the compensation time duration when the white-light source is started up and the compensating light source is not started up satisfy:

$$x = x_0 + \emptyset_R * \delta_R + \emptyset_B * \delta_B$$
$$y = y_0 + \emptyset_R * \sigma_R + \emptyset_B * \sigma_B$$

wherein $\emptyset_R$ and $\emptyset_B$ are respectively a ratio of an intensity of the red-light source to an intensity of the white-light source and a ratio of an intensity of the blue-light source to the intensity of the white-light source, $\delta_R$ and $\delta_B$ are respectively impact factors of a red light and a blue light to an x chromaticity coordinate, and $\sigma_R$ and $\sigma_B$ are respectively impact factors of a red light and a blue light to a y chromaticity coordinate.

Optionally, $0 \leq \emptyset_B \leq 10\%$, and $0 \leq \emptyset_R \leq 10\%$; $-0.08 \leq \delta_B \leq -0.01$, and $0.07 \leq \delta_R \leq 0.2$; and $-0.2 \leq \sigma_B \leq -0.07$, and $-0.012 \leq \sigma_R \leq -0.005$.

Optionally, the compensating light source comprises a red-light source, a green-light source and a blue-light source; and a white-dot chromaticity coordinate (x,y) of the displaying module within the compensation time duration when the white-light source and the compensating light source are started up and a white-dot chromaticity coordinate ($x_0$,$y_0$) of the displaying module within the compensation time duration when the white-light source is started up and the compensating light source is not started up satisfy:

$$x = x_0 + \emptyset_R * \delta_R + \emptyset_G * \delta_G + \emptyset_B * \delta_B$$
$$y = y_0 + \emptyset_R * \sigma_R + \emptyset_G * \sigma_G + \emptyset_B * \sigma_B$$

wherein $\emptyset_R$, $\emptyset_G$ and $\emptyset_B$ are respectively a ratio of an intensity of the red-light source to an intensity of the white-light source, a ratio of an intensity of the green-light source to the intensity of the white-light source, and a ratio of an intensity of the blue-light source to the intensity of the white-light source, $\delta_R$, $\delta_G$ and $\delta_B$ are respectively impact factors of a red light, a green light and a blue light to an x chromaticity coordinate, and $\sigma_R$, $\sigma_G$ and $\sigma_B$ are respectively impact factors of a red light, a green light and a blue light to a y chromaticity coordinate.

Optionally, $0 \leq \emptyset_R \leq 10\%$, $0 \leq \emptyset_G \leq 10\%$, and $0 \leq \emptyset_B \leq 10\%$; $0.07 \leq \delta_R \leq 0.2$, $-0.2 \leq \delta_G \leq 0.2$, and $-0.08 \leq \delta_B \leq -0.01$; and $-0.012 \leq \sigma_R \leq -0.005$, $0.15 \leq \sigma_G \leq 0.3$, and $-0.2 \leq \sigma_B \leq -0.07$.

Optionally, the backlight module further comprises a light guide plate, and the white-light source and the compensating light source are placed on two opposite sides of the light guide plate.

Optionally, the backlight module further comprises a diffusing plate and a reflector plate, the white-light source and the compensating light source are provided between the diffusing plate and the reflector plate, and the compensating light source is provided at a periphery of the white-light source.

Optionally, the white-light source comprises a plurality of white-light emitting units, the compensating light source comprises a plurality of compensating light emitting units, and a quantity of the compensating light emitting units is less than a quantity of the white-light emitting units.

Optionally, the backlight module further comprises a temperature monitoring unit, and the temperature monitoring unit is electrically connected to the primary driving module;

the temperature monitoring unit is configured for, within the compensation time duration, collecting an environmental temperature and transmitting an environmental-temperature information to the primary driving module; and the primary driving module is further configured for acquiring the environmental-temperature information.

Optionally, the backlight module further comprises a heat dissipating unit, and the heat dissipating unit is electrically connected to the primary driving module;

the primary driving module is further configured for, if the environmental temperature is greater than a first preset temperature, transmitting a first controlling signal to the heat dissipating unit, wherein the first preset temperature is less than a thermal-equilibrium temperature of the displaying module; and the heat dissipating unit is configured for, according to the first controlling signal transmitted by the primary driving module, starting up or increasing a heat-dissipation power.

Optionally, the primary driving module is further configured for, if the environmental temperature is less than a second preset temperature, transmitting a second controlling signal to the heat dissipating unit, wherein the second preset temperature is less than the first preset temperature; and the heat dissipating unit is configured for, according to the second controlling signal transmitted by the primary driving module, shutting down or reducing the heat-dissipation power.

Optionally, the preset range is $-0.002 \sim +0.002$.

Optionally, the primary driving module is further configured for predetermining a plurality of instances of the compensation-driving function, wherein the compensation-driving functions correspond to different environmental temperatures.

Optionally, the environmental temperatures corresponding to the plurality of compensation-driving functions are ordered sequentially from a lower environmental temperature to a higher environmental temperature, and a range of absolute values of differences between neighboring instances of the environmental temperatures is $3 \sim 7°$ C.

In another aspect, there is provided a displaying module, wherein the displaying module comprises a display panel and the backlight module stated above, and the backlight module is provided on a shadow side of the display panel.

In yet another aspect, there is provided a driving method for the backlight module, wherein the backlight module is applied to a displaying module, and the driving method comprises:

by the primary driving module, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures;

by the primary driving module, according to the selected compensation-driving function, supplying a compensation controlling signal to the compensating driving module;

by the compensating driving module, acquiring the compensation controlling signal, and according to the compensation controlling signal, supplying a driving signal to the compensating light source; and by the compensating light source, acquiring the driving signal, and emitting light when driven by the driving signal, whereby a variation value of a white-dot chromaticity coordinate of the displaying module within the compensation time duration is within a preset range.

Optionally, before the step of, by the primary driving module, within the compensation time duration, according to the current environmental temperature, selecting the compensation-driving function corresponding to the current environmental temperature, the driving method further comprises:

by the primary driving module, predetermining a plurality of instances of the compensation-driving function, wherein the compensation-driving functions correspond to different environmental temperatures.

Optionally, the step of, by the primary driving module, predetermining the plurality of instances of the compensation-driving function comprises:

establishing the plurality of compensation-driving functions; and placing the plurality of compensation-driving functions into the primary driving module.

Optionally, the step of establishing the compensation-driving functions comprises:

simulating a state of variation with time of a temperature of the displaying module in a room-temperature environment, to obtain a temperature-rise curve of the displaying module in the room-temperature environment;

simulating corresponding chromaticity values at different temperatures of the displaying module, to obtain a first relation curve between the temperatures and the chromaticity values of the displaying module;

according to a maximum chromaticity variation value, determining a type and a driving mode of the compensating light source, to obtain a second relation curve between the chromaticity values of the displaying module and electric currents of the compensating light source;

according to the first relation curve and the second relation curve, determining a pre-correction compensation-driving function; and according to actually measured data, correcting the pre-correction compensation-driving function, to obtain the compensation-driving function corresponding to the room-temperature environment.

Optionally, the backlight module further comprises a temperature monitoring unit; and before the step of, by the primary driving module, within the compensation time duration, according to the current environmental temperature, selecting the compensation-driving function corresponding to the current environmental temperature, the driving method further comprises:

by the temperature monitoring unit, within the compensation time duration, collecting an environmental temperature and transmitting an environmental-temperature information to the primary driving module; and by the primary driving module, acquiring the environmental-temperature information.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are embodiments of the present application, and a person skilled in the art can obtain other figures according to these figures without paying creative work.

DETAILED DESCRIPTION

Figure 1:
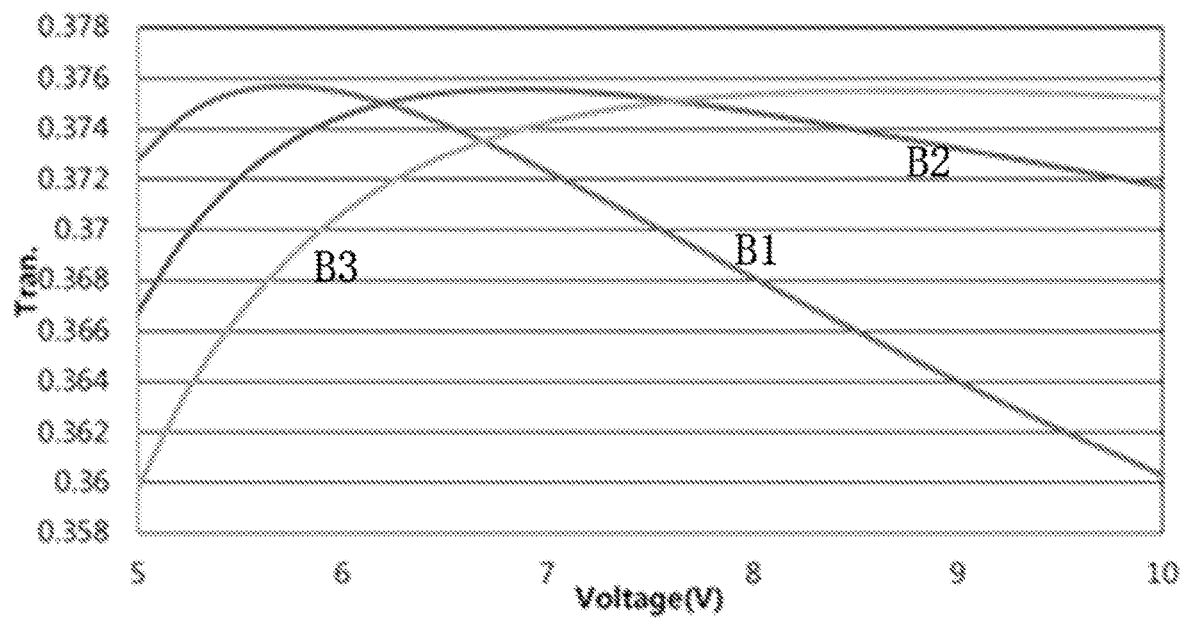
FIGS. 1 and 2 illustratively show V-T curve diagrams of two types of liquid-crystal displays.

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, terms such as "first" and "second" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features. Furthermore, the meaning of "plurality of" is "two or more", unless explicitly and particularly defined otherwise.

The chromaticity deviation caused by temperature variation is mainly due to two aspects, wherein one is the backlight module, and the other one is the display panel itself. After the backlight has been lightened, the light bar, as the main heat source, starts to generate heat, and the environmental temperature around the LED gradually increases. Because of the characteristics of the LED, the LED has different chromaticity behaviors at different environmental temperatures. The display panel has a limited self-heat after lightened, and does not have an obvious temperature rise. However, under a backlight module having a good heat dissipation, the temperature rise of the backlight finally results in the temperature rise of the display panel; in other words, the surface temperature of the display panel increases with the increasing of the temperature of the backlight. At the same time, the heat generation of the elements on the PCB (Printed Circuit Board) further increases the temperature rise of the display panel by thermal conduction. Moreover, the LED, as the heat source, has a very quick temperature rise, and can reach the temperature close to the thermal equilibrium within a short time. Therefore, in the whole process it has a little influence, and it can be considered that the chromaticity of the LED is relatively stable. Taking an 18.4-inch display product as an example, if it is lightened in a room-temperature environment (25° C.), after the temperature has been stable, the temperature on the side of the light bar of the back plate is approximately 49~50° C., and the surface temperature of the center of the display panel is approximately 45° C. The behaviors in the liquid-crystal optics of the module at the initial stage of the powered-on starting-up and after the temperature rise are highly different. At 1 min the white-dot chromaticity coordinate is (0.3265,0.3135), after 60 minutes the white-dot chromaticity coordinate changes into (0.3216,0.3049), and correspondingly the color temperature of the module changes from 5816K to 6140K, which indicates that white-dot drifting happens.

Figure 2:
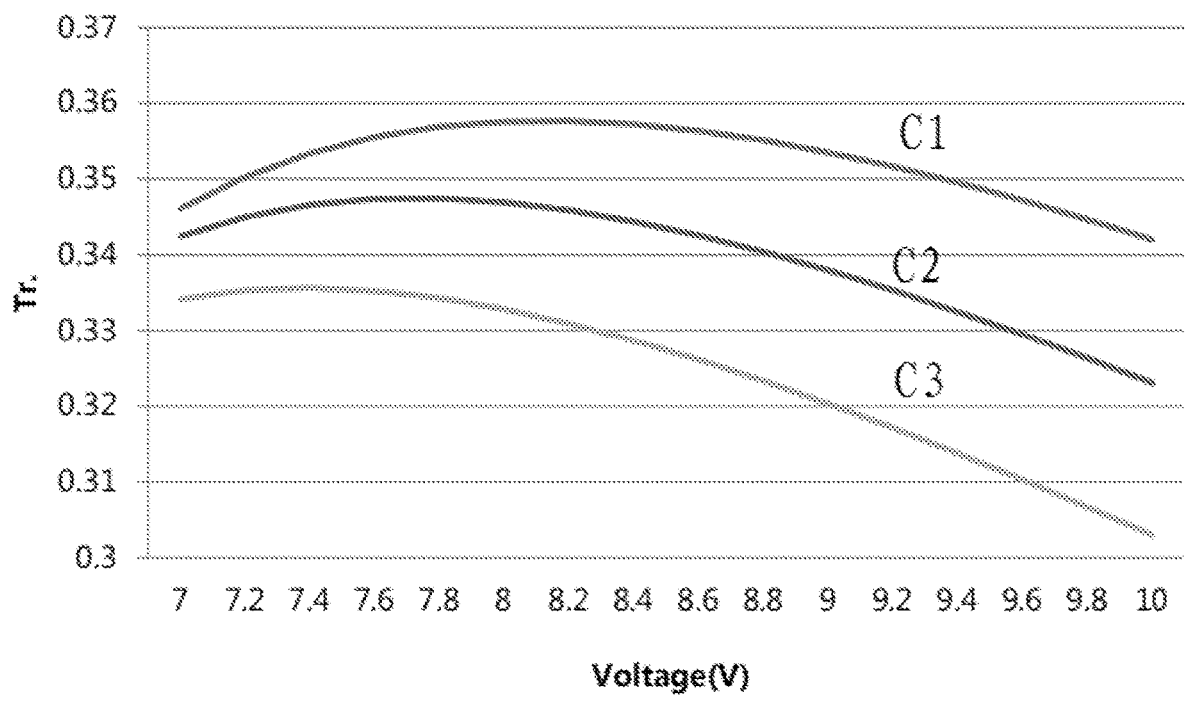

In both of VA (Vertical Alignment) type and ADS (Advanced Super Dimension Switch) type displays, the optical characteristics of the liquid crystal vary at different temperatures; in other words, the VT curves and the Vops have different behaviors at different temperatures, which influences the optical brightness, the chromaticity and so on. FIG. 1 is a simulated diagram of three VT curves between the light transmissivity (Tran) and the voltage (Voltage) of a VA-type display, wherein the curves B1, B2 and B3 correspond to 25° C., 40° C. and 50° C. respectively. FIG. 2 is a simulated diagram of three VT curves between the light transmissivity (Tran) and the voltage (Voltage) of an ADS-type display, wherein the curves C1, C2 and C3 correspond to 25° C., 40° C. and 50° C. respectively. Referring to FIGS. 1 and 2, the light transmissivities of the liquid-crystal displays at the different temperatures are unequal. Because the variations in the light transmissivity of unequal wavelengths are different, that causes that, at the different temperatures, the proportion of the R (red light), G (green light) and B (blue light) components in the white light varies, which results in variation in the color temperature.

In high-brightness products, because the heat generation is serious, from the initial starting-up to the stable operation, the whole body has a relatively high temperature rise, and before the thermal equilibrium, the frame color temperature in the white frame highly varies, whereby chromaticity deviation happens.

Figures 3, 4:
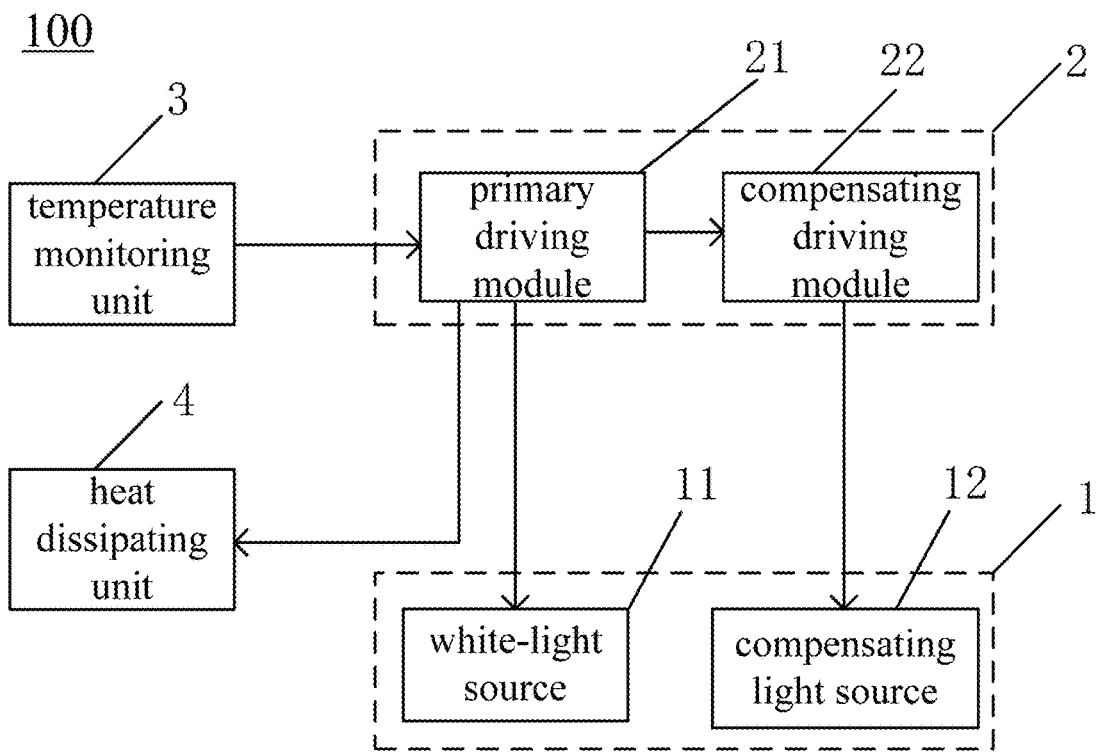
FIG. 3 schematically shows a schematic diagram of the modular structure of a backlight module.
FIG. 4 schematically shows simulation values of the chromaticity variations when the original backlight source, as a base, is added a red-light source, a green-light source and a blue-light source individually.

Based on the above, an embodiment of the present application provides a backlight module, wherein the backlight module is applied to a displaying module. Referring to FIG. 3, the backlight module 100 comprises a backlight source 1 and a backlight driving unit 2. The backlight source 1 comprises a white-light source 11 and a compensating light source 12, the exiting-light-wavelength range of the white-light source is a first wavelength range, and the exiting-light-wavelength range of the compensating light source is a second wavelength range, wherein the second wavelength range is within the first wavelength range. The backlight driving unit 2 comprises a primary driving module 21 and a compensating driving module 22.

The primary driving module is electrically connected to the white-light source and the compensating driving module, and is configured for, within a compensation time duration, according to a current environmental temperature, selecting a compensation-driving function corresponding to the current environmental temperature, wherein the compensation time duration refers to the time duration from an initial starting-up moment of the displaying module to a thermal-equilibrium moment, and the compensation-driving function contains a correspondence relation between the driving currents of the compensating light source and the environmental temperatures; and according to the selected compensation-driving function, supplying a compensation controlling signal to the compensating driving module.

The compensating driving module is configured for acquiring the compensation controlling signal, and according to the compensation controlling signal, supplying a driving signal to the compensating light source.

The compensating light source is configured for acquiring the driving signal, and emitting light when driven by the driving signal, whereby the variation value of the white-dot chromaticity coordinate of the displaying module within the compensation time duration is within a preset range.

The backlight module may be of a side-incident type, and may also be of a direct type, which is not limited herein. The side-incident-type backlight module further comprises a light guide plate, and the backlight source is provided on one side of the light guide plate. In this case, the white-light source and the compensating light source may be placed on the two opposite sides of the light guide plate, and the white-light source and the compensating light source may also be provided on the same one side of the light guide plate. Certainly, there may also be other provision modes, which is not limited herein. The direct-type backlight module further comprises a diffusing plate and a reflector plate, and the backlight source is provided between the diffusing plate and the reflector plate. In this case, the white-light source and the compensating light source are provided between the diffusing plate and the reflector plate, and the compensating light source is provided at the periphery of the white-light source.

The compensating light source may include a monochromatic light source, for example, a blue-light source, a red-light source, a green-light source or a yellow-light source. Alternatively, the compensating light source may also include a dichromatic light source, for example, a blue-light source and a red-light source, which, certainly, may also be light sources of two other colors. Alternatively, the compensating light source may also include a trichromatic light source, for example, a blue-light source, a red-light source and a green-light source, which is not limited herein, and is particularly determined according to practical products.

The particular structures of the primary driving module and the compensating driving module are not limited. As an example, the primary driving module may comprise an SOC (System on Chip). The compensating driving module may comprise a compensating driving chip, and the compensating driving chip may be a chip such as a single chip microcomputer, an ARM (Advanced RISC Machines) or a FPGA (Field Programmable Gate Array), which may be particularly determined according to practical design requirements.

The primary driving module may also be configured for controlling the white-light source to emit light. Within a compensation time duration, Both of the compensating light source and the white-light source emit light, and the compensating light source can serve for color-temperature compensation, thereby greatly ameliorating the problem of chromaticity deviation of the displaying module within the time duration between the initial starting-up moment and the thermal-equilibrium moment.

The particular form of the compensation-driving function is not limited, as long as it contains a correspondence relation between the driving currents of the compensating light source and the environmental temperatures. The compensation-driving function may be preset in the primary driving module.

The compensation time duration refers to the time duration from an initial starting-up moment of the displaying module to a thermal-equilibrium moment, wherein the initial starting-up moment comprises the starting-up moment of the displaying module of the backlight module, and the thermal-equilibrium moment refers to the moment when the displaying module reaches the thermal equilibrium state. The thermal equilibrium refers to a state in which the internal temperatures of all of the points of an object that contacts the external are equal and are equal to the external temperature. At the thermal equilibrium, the parts of the object, and the object and the external, do not have heat exchange therebetween.

According to the colorimetrical principle, in CIE1931 XYZ and CIE1964 XYZ standard chromaticity systems, the XYZ tristimulus values of a certain light source may be obtained by integrating the intensity of the light source over the entire spectrum with the tristimulus values of the spectrum. In colorimetry, the same one color temperature may correspond to multiple chromaticity coordinates, and the color temperature calculated by using the same one chromaticity coordinate is fixed. Therefore, by ensuring that the white-dot chromaticity coordinate is stable, it can be ensured that the color temperature of a white frame is stable. The variation value of the white-dot chromaticity coordinate (x,y) of the displaying module within the compensation time duration refers to the variation value of x and the variation value of y. The preset range may be preset according to practical demands, and within the preset range, the variation value of the white-dot chromaticity coordinate is within an acceptable range, whereby the color temperature of the white frame is stable. The color temperature CCT is calculated by using the white-dot chromaticity coordinate (x,y), wherein the particular formula is as follows:

$$CCT = -437 \cdot \left(\frac{x-0.332}{y-0.1858}\right)^2 + 3601 \cdot \left(\frac{x-0.332}{y-0.1858}\right)^2 - 6861 \cdot \frac{x-0.332}{y-0.1858} + 5514.31$$

In the related art, the displaying module, within the time duration from the starting-up to the stable operation (i.e., the thermal equilibrium state), has the variation in the color temperature of the white frame, wherein the chromaticity variation or color-temperature variation with respect to a white frame refers to the variation of the proportion of the transmitted lights of different colors. In the present application, by providing the compensating light source, the lights of the corresponding chromaticities in the white-light source are compensated, thereby greatly reducing the variation value of the proportion of the lights of the corresponding chromaticities caused by temperature variation, which ensures that the proportion of the lights of different colors maintains stable, greatly ameliorates the problem of chromaticity deviation of the displaying module, improves the product quality, and facilitates the performance optimization of high-brightness products.

Because the variation value within the compensation time duration of the white-dot chromaticity coordinate of the displaying module varies with time, the working efficiency (or the luminous intensity) of the compensating light source also varies with time. Optionally, the working efficiency $\eta$ of the compensating light source satisfies:

$$\eta = 100\% * \left(1 - \frac{t}{T_w} * A\right) , t \leq T_w$$
$$\eta = 0 \qquad\qquad\qquad , t > T_w$$

wherein t represents the duration, Tw is the thermal-equilibrium duration of the displaying module, and A is the module impact factor.

Tw is the equal to the duration of the compensation time duration. The functional expression of the working efficiency $\eta$ of the compensating light source may also be another functional expression, which may be particularly determined according to corresponding structures.

The module impact factor A is a function related to the duration t, and the particular function relation depends on different structural designs. The compensating light source operates at a 100% maximum working efficiency at the initial starting-up of the displaying module, the working efficiency gradually decreases over time, and, at the thermal equilibrium, the compensating light source stops operating.

Optionally, in order to implement easily, the compensating light source comprises a blue-light source. Alternatively, the compensating light source comprises a blue-light source and a red-light source. Alternatively, the compensating light source comprises a red-light source, a green-light source and a blue-light source. Those may be particularly selected according to practical situations. FIG. 4 is simulation values of the chromaticity variations when the original backlight source, as a base, is added a red-light source, a green-light source and a blue-light source individually, wherein the luminous intensity of the original backlight source is 100% reference, 1% B, 1% R and 1% G represent a blue-light source of a 1% luminous intensity, a red-light source of a 1% luminous intensity and a green-light source of a 1% luminous intensity respectively, and the meanings of the other numerical values may refer to the above description, and are not described in detail herein. Referring to FIG. 4, the blue-light source can reduce the x chromaticity coordinate and the y chromaticity coordinate, the red-light source can increase the x chromaticity coordinate and reduce the y chromaticity coordinate, and the green-light source can reduce the x chromaticity coordinate and increase the y chromaticity coordinate.

In one or more embodiments, the compensating light source comprises a blue-light source, to compensate by using a monochromatic light source, with a simple structure and a low cost. The white-dot chromaticity coordinate (x,y) of the displaying module within the compensation time duration when the white-light source and the compensating light source are started up and the white-dot chromaticity coordinate $(x_0,y_0)$ of the displaying module within the compensation time duration when the white-light source is started up and the compensating light source is not started up satisfy:

$$x = x_0 + \emptyset_B * \delta_B$$
$$y = y_0 + \emptyset_B * \sigma_B$$

wherein $\emptyset_B$ is the ratio of the intensity of the blue-light source to the intensity of the white-light source, $\delta_B$ is the impact factor of a blue light to the x chromaticity coordinate, and GB is the impact factor of a blue light to the y chromaticity coordinate.

In order to further ensure the effect of the compensation, it is obtained by a large amount of simulation and actual measurement that: $0 \leq \emptyset_B \leq 10\%$; $-0.08 \leq \delta_B \leq -0.01$; and $-0.2 \leq \sigma_B \leq -0.07$.

In one or more embodiments, the compensating light source comprises a blue-light source and a red-light source, to compensate by using a dichromatic light source, with a more flexible compensation mode and a wider range of application. The white-dot chromaticity coordinate (x,y) of the displaying module within the compensation time duration when the white-light source and the compensating light source are started up and the white-dot chromaticity coordinate $(x_0,y_0)$ of the displaying module within the compensation time duration when the white-light source is started up and the compensating light source is not started up satisfy:

$$x = x_0 + \emptyset_R * \delta_R + \emptyset_B * \delta_B$$
$$y = y_0 + \emptyset_R * \sigma_R + \emptyset_B * \sigma_B$$

wherein $\emptyset_R$ and $\emptyset_B$ are respectively the ratio of the intensity of the red-light source to the intensity of the white-light source and the ratio of the intensity of the blue-light source to the intensity of the white-light source, $\delta_R$ and $\delta_B$ are respectively the impact factors of a red light and a blue light to the x chromaticity coordinate, and $\sigma_R$ and $\sigma_B$ are respectively the impact factors of a red light and a blue light to the y chromaticity coordinate.

In order to further ensure the effect of the compensation, it is obtained by a large amount of simulation and actual measurement that:
$0 \leq \emptyset_B \leq 10\%$, and $0 \leq \emptyset_R \leq 10\%$; $-0.08 \leq \delta_B \leq -0.01$, and $0.07 \leq \delta_R \leq 0.2$; and $-0.2 \leq \sigma_B \leq -0.07$, and $-0.012 \leq \sigma_R \leq -0.005$.

In one or more embodiments, the compensating light source comprises a red-light source, a green-light source and a blue-light source, to compensate by using a trichromatic light source. The white-dot chromaticity coordinate (x,y) of the displaying module within the compensation time duration when the white-light source and the compensating light source are started up and the white-dot chromaticity coordinate $(x_0,y_0)$ of the displaying module within the compensation time duration when the white-light source is started up and the compensating light source is not started up satisfy:

$$x = x_0 + \emptyset_R * \delta_R + \emptyset_G * \delta_G + \emptyset_B * \delta_B$$
$$y = y_0 + \emptyset_R * \sigma_R + \emptyset_G * \sigma_G + \emptyset_B * \sigma_B$$

wherein $\emptyset_R$, $\emptyset_G$ and $\emptyset_B$ are respectively the ratio of the intensity of the red-light source to the intensity of the white-light source, the ratio of the intensity of the green-light source to the intensity of the white-light source, and the ratio of the intensity of the blue-light source to the intensity of the white-light source, $\delta_R$, $\delta_G$ and $\delta_B$ are respectively the impact factors of a red light, a green light and a blue light to the x chromaticity coordinate, and $\sigma_R$, $\sigma_G$ and $\sigma_B$ are respectively the impact factors of a red light, a green light and a blue light to the y chromaticity coordinate.

In order to further ensure the effect of the compensation, it is obtained by a large amount of simulation and actual measurement that:
$0 \leq \emptyset_R \leq 10\%$, $0 \leq \emptyset_G \leq 10\%$, and $0 \leq \emptyset_B \leq 10\%$; $0.07 \leq \delta_R \leq 0.2$, $-0.2 \leq \delta_G \leq 0.2$, and $-0.08 \leq \delta_B \leq -0.01$; and $-0.012 \leq \sigma_R \leq -0.005$, $0.15 \leq \sigma_G \leq 0.3$, and $-0.2 \leq \sigma_B \leq -0.07$.

Figure 5:
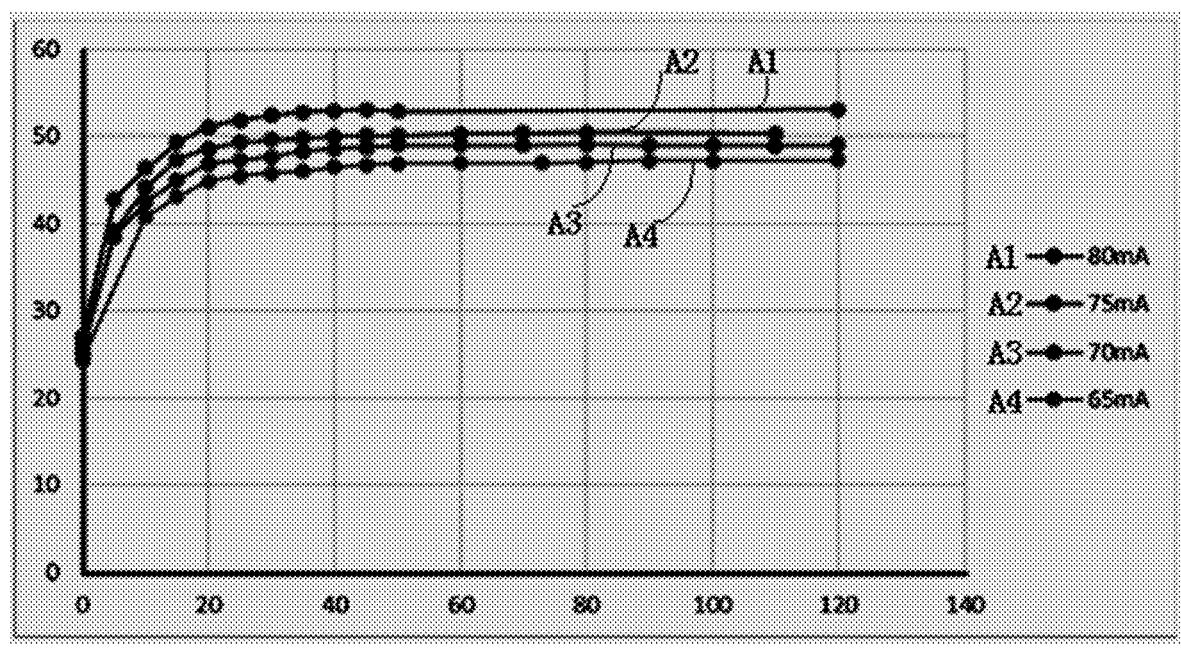
FIG. 5 schematically shows temperature-rise curves of a light emitting diode with different driving currents.
Figure 6:
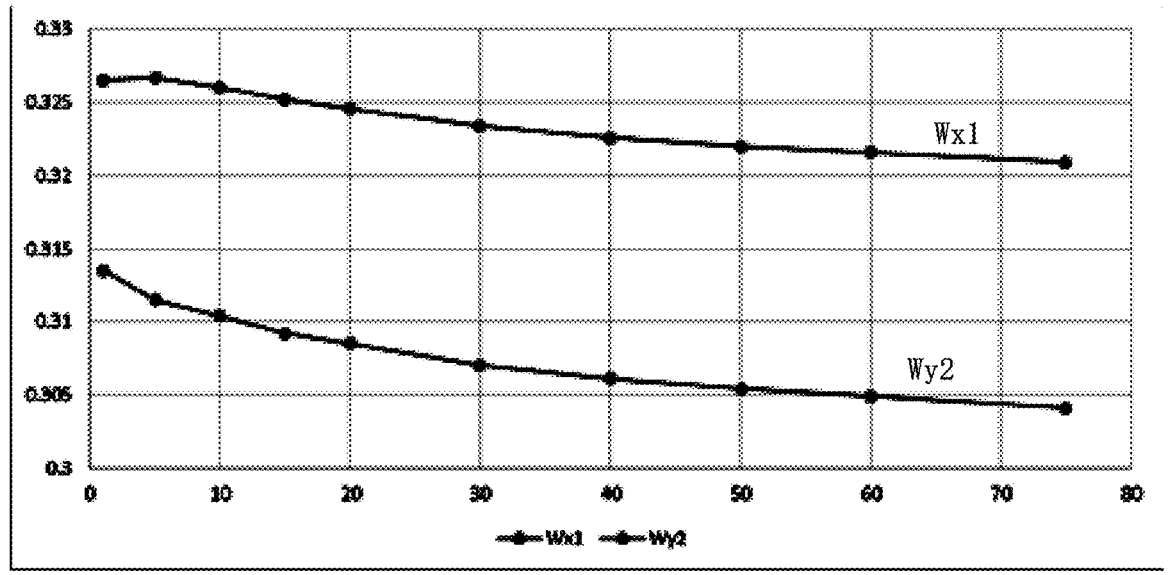
FIG. 6 schematically shows curves of the variation with time of the chromaticity of the white-dot chromaticity coordinate (x,y) driven by 80 mA.

An 18.4-inch broadcasting product will be taken as an example for the description of the effect of the compensation. The temperature-rise curves of a light emitting diode with different driving currents are shown in FIG. 5. The curves of the variation with time of the chromaticity of the white-dot chromaticity coordinate (x,y) driven by 80 mA are shown in FIG. 6. When no compensation exists, referring to FIG. 6, at the beginning of the starting-up, the white-dot chromaticity coordinate is (0.3265,0.3135), and the corresponding color temperature is 5816K. When the thermal equilibrium has been reached, the white-dot chromaticity coordinate is (0.3209,0.3039), and the corresponding color temperature is 6191K. In other words, the color temperature decreases from 5816K to 6191K, so chromaticity deviation happens. FIG. 5 shows four temperature-rise curves, wherein the curves A1, A2, A3 and A4 represent the temperature-rise curves at the driving currents of 80 mA, 75 mA, 70 mA and 65 mA respectively, the horizontal coordinate represents the duration with the unit of minutes, and the vertical coordinate represents the temperature with the unit of degrees Celsius. In FIG. 6, the curves of the variation with time of the chromaticity of the chromaticity coordinate x and the chromaticity coordinate y when driven by 80 mA are marked as Wx1 and Wy1 respectively, wherein the horizontal coordinate represents the duration with the unit of minutes, and the vertical coordinate represents the chromaticity coordinate and is unitless.

Figure 7:
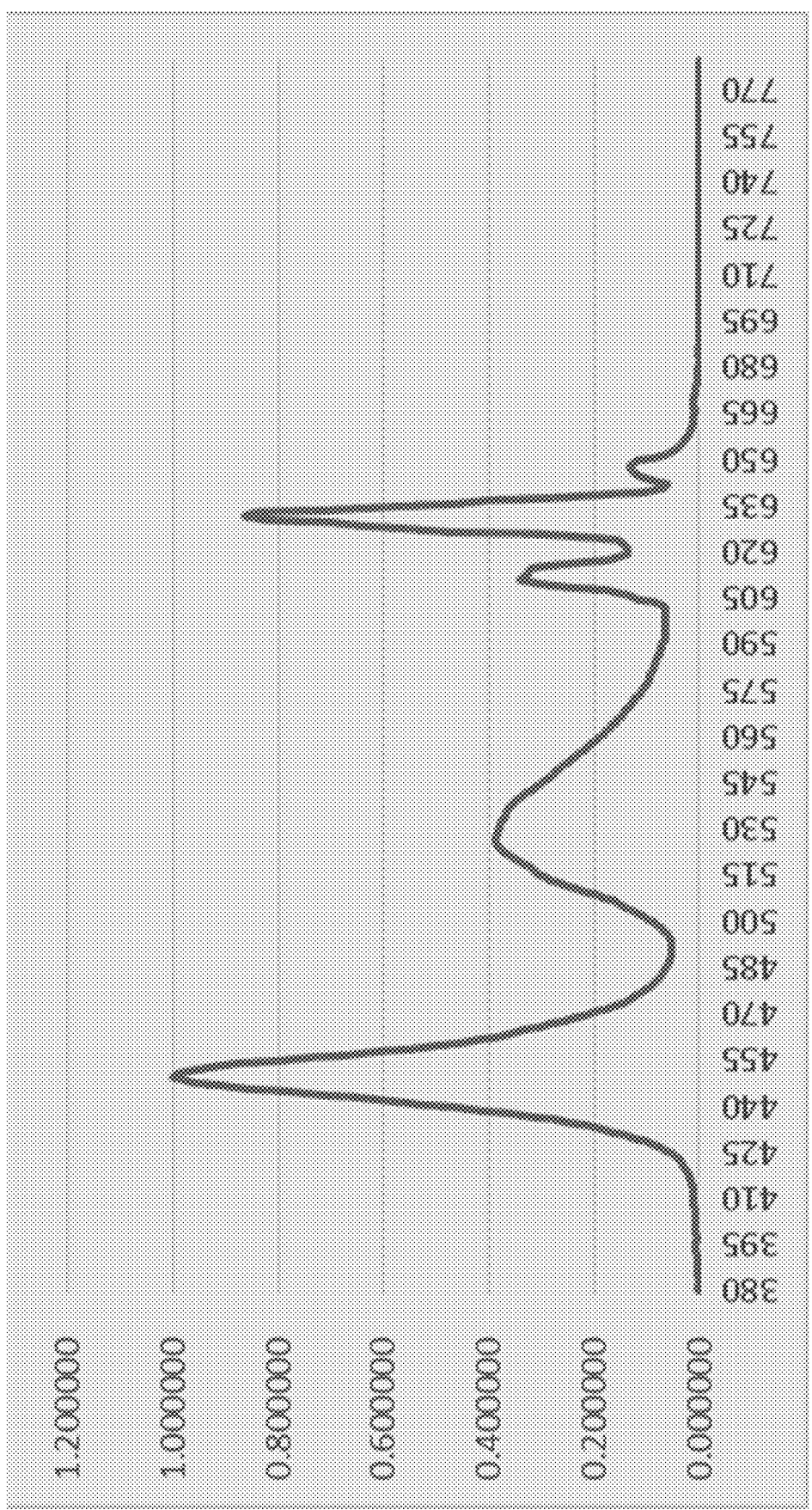
FIG. 7 schematically shows a normalized spectrogram of an original backlight source.
Figure 8:
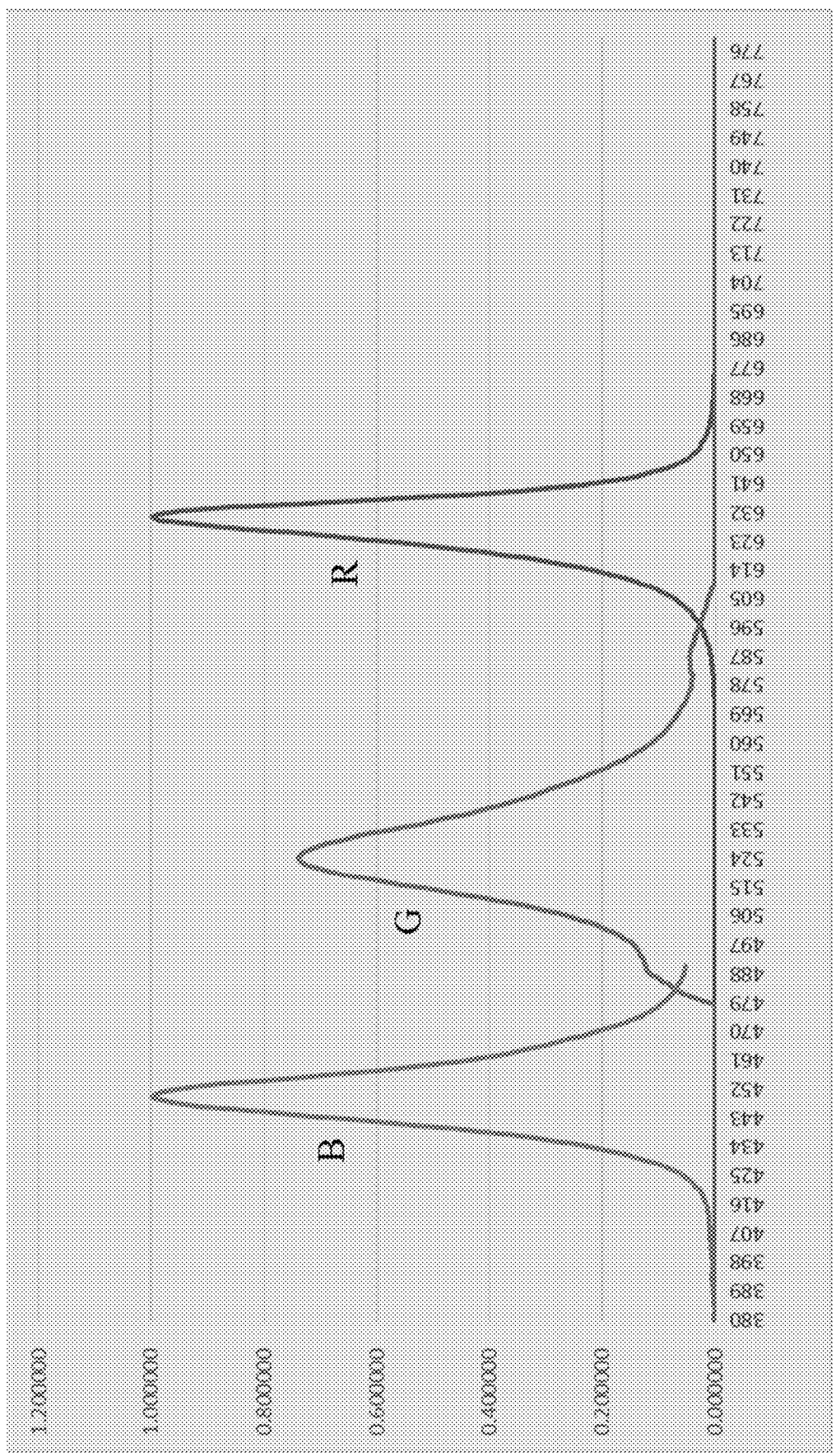
FIG. 8 schematically shows normalized spectrograms when R, G and B monochromatic LEDs are used as the compensating light source.
Figure 9:
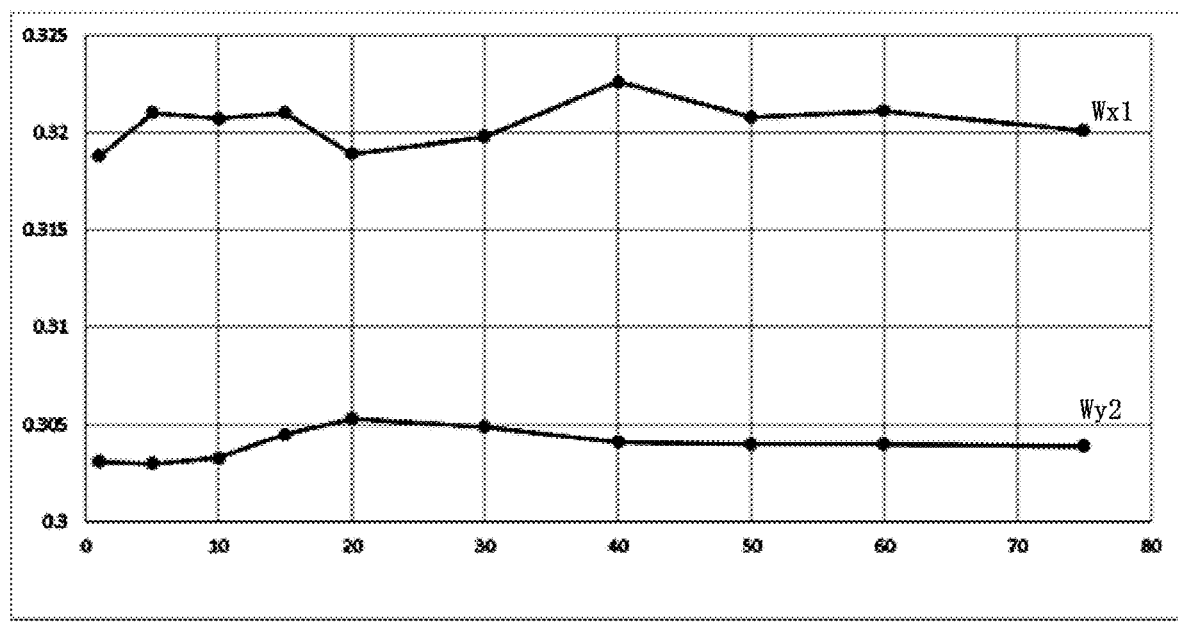
FIG. 9 schematically shows a curve diagram of the variation with time of the chromaticity of the adjusted chromaticity coordinate x and the adjusted chromaticity coordinate y when driven by 80 mA.

A normalized spectrogram of the original backlight source of the product is shown in FIG. 7, wherein R, G and B monochromatic LEDs are used as the compensating light source, and their normalized spectrograms are shown in FIG. 8. In FIGS. 7 and 8, the horizontal coordinate represents the wavelength with the unit of nanometers, and the vertical coordinate represents the normalized relative light intensity and is unitless. By referring to FIG. 4, it can be known that the blue-light source can reduce the x chromaticity coordinate and the y chromaticity coordinate, the red-light source can increase the x chromaticity coordinate and reduce the y chromaticity coordinate, and the green-light source can reduce the x chromaticity coordinate and increase the y chromaticity coordinate. Therefore, 6-7% blue-color LEDs may be used for the compensation. Alternatively, red-color LEDs and blue-color LED may also be used for the color-temperature regulation. Referring to FIG. 9, after the compensation, the white-dot chromaticity coordinate corresponding to the initial starting-up is (0.3188,0.3031), and the corresponding color temperature is 6331K. When the thermal equilibrium has been reached, the white-dot chromaticity coordinate is (0.3201,0.3039), and the corresponding color temperature is 6242K. Throughout the compensation stage, the variations of the x and y chromaticity coordinates are within ±0.002, which is the same as the variation range of conventional liquid-crystal modules, which indicates that the controlling method is effective. In FIG. 9, the curves of the variation with time of the chromaticity of the adjusted chromaticity coordinate x and the adjusted chromaticity coordinate y when driven by 80 mA are marked as Wx1 and Wy1 respectively, wherein the horizontal coordinate represents the duration with the unit of minutes, and the vertical coordinate represents the chromaticity coordinate and is unitless.

Figure 10:
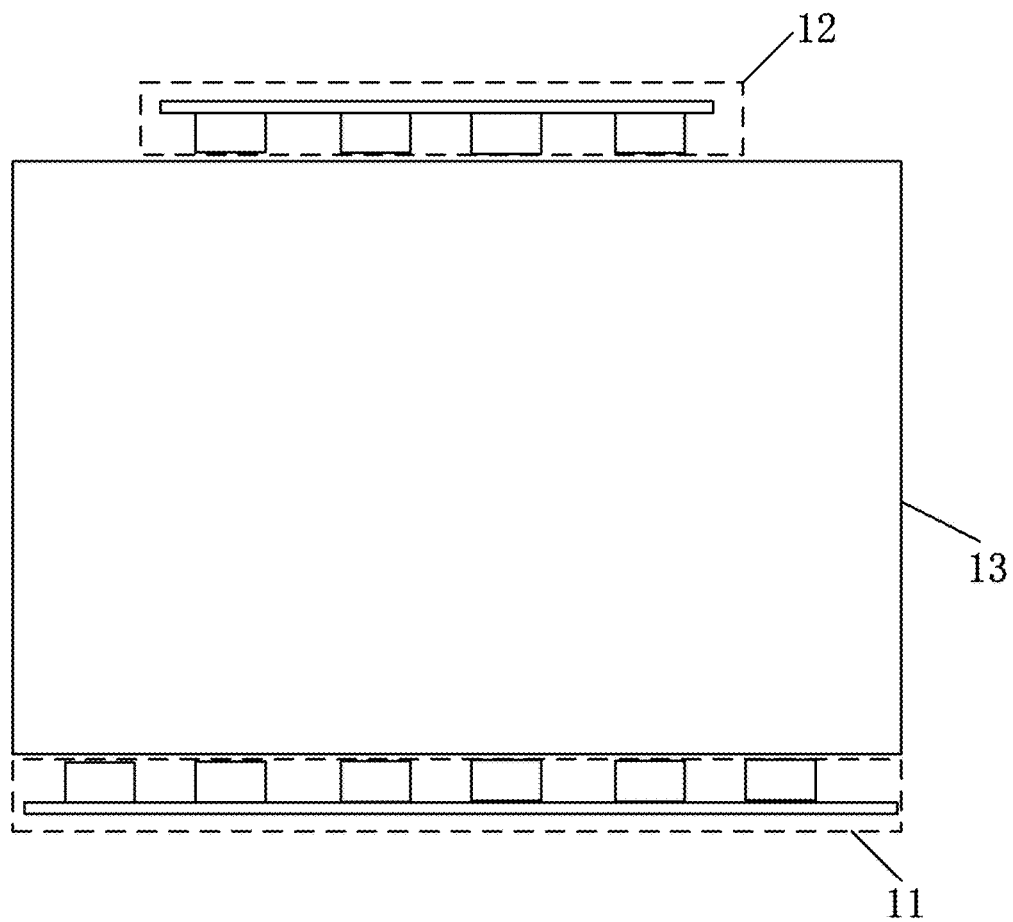
FIGS. 10-11 illustratively show schematic structural diagrams of two types of the backlight module.

In order to reduce the volume, to facilitate light weighting, the backlight module may be formed as a side-incident-type backlight module. Optionally, referring to FIG. 10, the backlight module further comprises a light guide plate 13, and the white-light source 11 and the compensating light source 12 are placed on the two opposite sides of the light guide plate 13. Each of the white-light source and the compensating light source may comprise a plurality of light emitting diodes, and the quantities are not limited, and may be selected according to practical situations.

Figure 11:
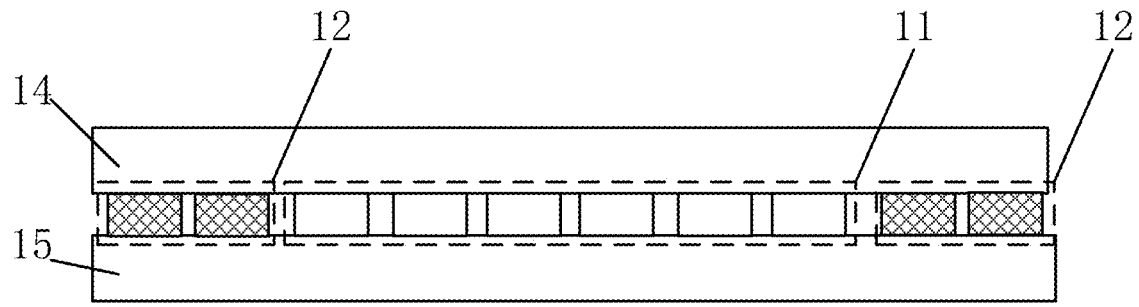
Figure 12:
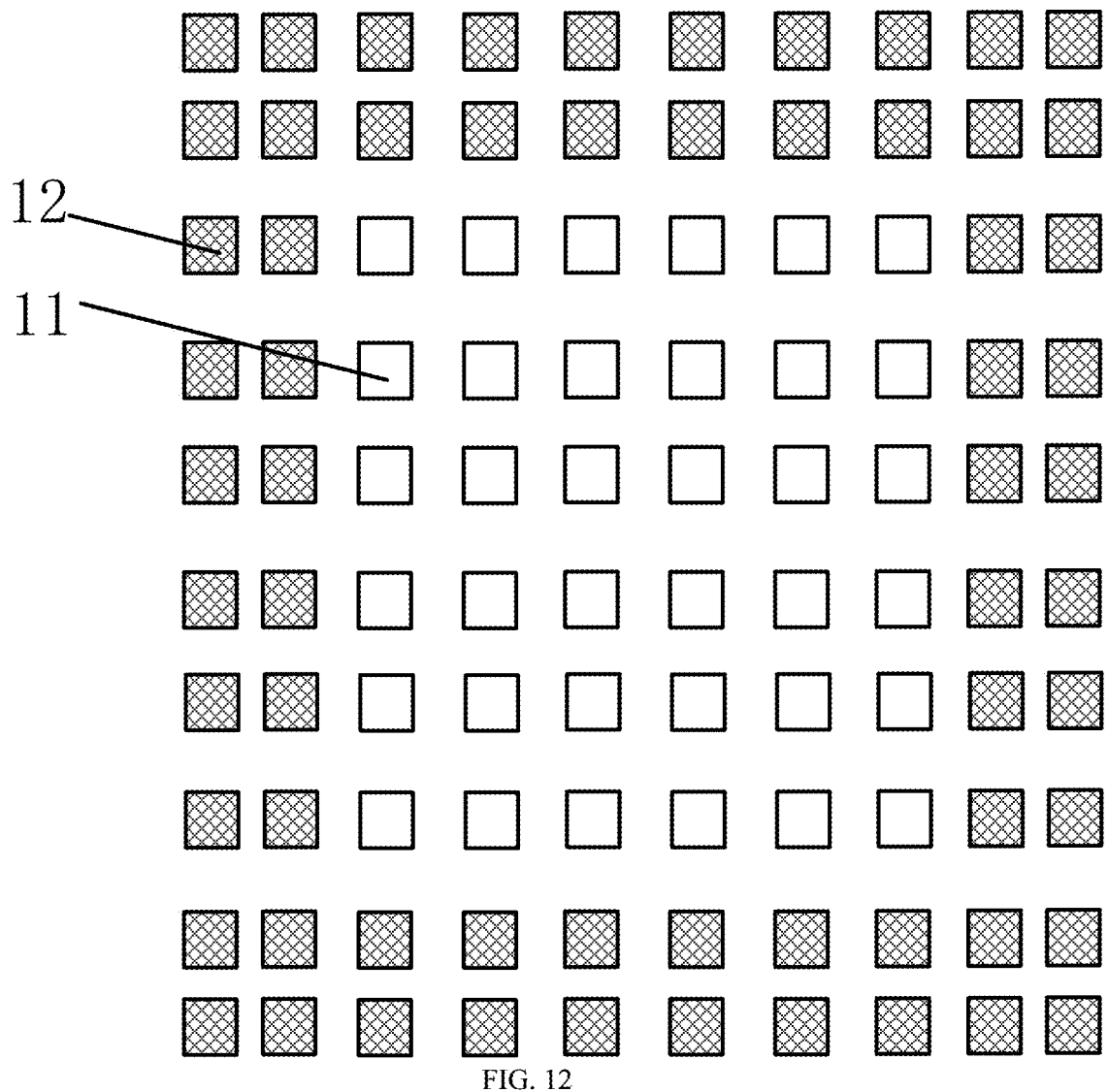
FIG. 12 schematically shows a schematic diagram of the distribution of the white-light sources and the compensating light sources.

In order to improve the effect of light emission, and increase the brightness of the backlight source to the largest extent, the backlight module may be formed as a direct-type backlight module. Optionally, referring to FIGS. 11 and 12, the backlight module further comprises a diffusing plate 14 and a reflector plate 15, the white-light source 11 and the compensating light source 12 are provided between the diffusing plate 14 and the reflector plate 15, and the compensating light source 12 is provided at the periphery of the white-light source 11. FIG. 12 illustrates merely by taking the case as an example in which the compensating light sources surround the white-light sources. Certainly, the compensating light sources may also be provided on one side or two sides of the white-light sources, which is not limited herein. Furthermore, the quantity of the rings of the surrounding of the white-light sources by the compensating light sources is not limited, and FIG. 12 illustrates by taking two rings as an example.

Optionally, the white-light source comprises a plurality of white-light emitting units, the compensating light source comprises a plurality of compensating light emitting units, and the quantity of the compensating light emitting units is less than the quantity of the white-light emitting units, thereby reducing the quantity of the light emitting units, to reduce the cost.

The white-light emitting units may be white-light light emitting diodes, and the compensating light emitting units may be compensating light emitting diodes. As an example, if the compensating light source comprises a blue-light source, the compensating light emitting units may comprise a blue-light diode. If the compensating light source comprises a blue-light source and a red-light source, the compensating light emitting units may comprise a blue-light diode and a red-light diode. If the compensating light source comprises a red-light source, a green-light source and a blue-light source, the compensating light emitting units may comprise a blue-light diode, a red-light diode and a green-light diode.

Optionally, referring to FIG. 3, the backlight module further comprises a temperature monitoring unit 3, and the temperature monitoring unit 3 is electrically connected to the primary driving module 21.

The temperature monitoring unit is configured for, within the compensation time duration, collecting an environmental temperature and transmitting an environmental-temperature information to the primary driving module.

The primary driving module is further configured for acquiring the environmental-temperature information.

In the present application, the temperature monitoring unit is used to collect the temperature of the ambient environment, which can be easily implemented and has a simple structure. The temperature monitoring unit may comprise a temperature sensor, and, certainly, may also comprise another temperature detecting device, which is not limited herein.

The complete-device products will have an increased temperature after long-time operation, which is especially obvious in high-brightness products. In order to ensure the reliability and the stability of the displaying chromaticity of the complete-device products, it is required to control the temperature of the complete device. Optionally, referring to FIG. 3, the backlight module further comprises a heat dissipating unit 4, and the heat dissipating unit 4 is electrically connected to the primary driving module 21.

The primary driving module is further configured for, if the environmental temperature is greater than a first preset temperature, transmitting a first controlling signal to the heat dissipating unit, wherein the first preset temperature is less than a thermal-equilibrium temperature of the displaying module.

The heat dissipating unit is configured for, according to the first controlling signal transmitted by the primary driving module, starting up or increasing a heat-dissipation power.

The particular numerical value of the first preset temperature is required to be determined according to actual products. As an example, if the thermal-equilibrium temperature of the displaying module in a room temperature (25° C.) environment is 50 degrees Celsius, then the first preset temperature may be set to be 48 degrees Celsius, to ensure the reliable operation at different environmental temperatures.

It should be noted that the heat dissipating unit may continue operating, and by the controlling by the first controlling signal, the heat-dissipation power is increased. If the heat dissipating unit comprises a fan, then the rotational speed may be increased to increase the heat-dissipation power. Alternatively, the heat dissipating unit may be started up by the controlling by the first controlling signal; in other words, it is started up and operates merely when the environmental temperature is greater than the first preset temperature, to save the power of the complete device.

In order to reduce the operation power of the complete device, optionally, the primary driving module is further configured for, if the environmental temperature is less than a second preset temperature, transmitting a second controlling signal to the heat dissipating unit, wherein the second preset temperature is less than the first preset temperature.

The heat dissipating unit is configured for, according to the second controlling signal transmitted by the primary driving module, shutting down or reducing the heat-dissipation power.

The particular numerical value of the second preset temperature is required to be determined according to actual products. As an example, if the thermal-equilibrium temperature of the displaying module in a room temperature (25° C.) environment is 50 degrees Celsius, then the first preset temperature may be set to be 48 degrees Celsius, and, in this case, the second preset temperature may be set to be 45 degrees Celsius.

The heat-dissipation power of the heat dissipating unit may be reduced by the controlling by the first controlling signal. If the heat dissipating unit comprises a fan, then the rotational speed may be reduced to increase the heat-dissipation power. Alternatively, the heat dissipating unit may be shut down by the controlling by the second controlling signal; in other words, if the environmental temperature is less than the second preset temperature, it stops operating, to save the power of the complete device.

Figure 13:
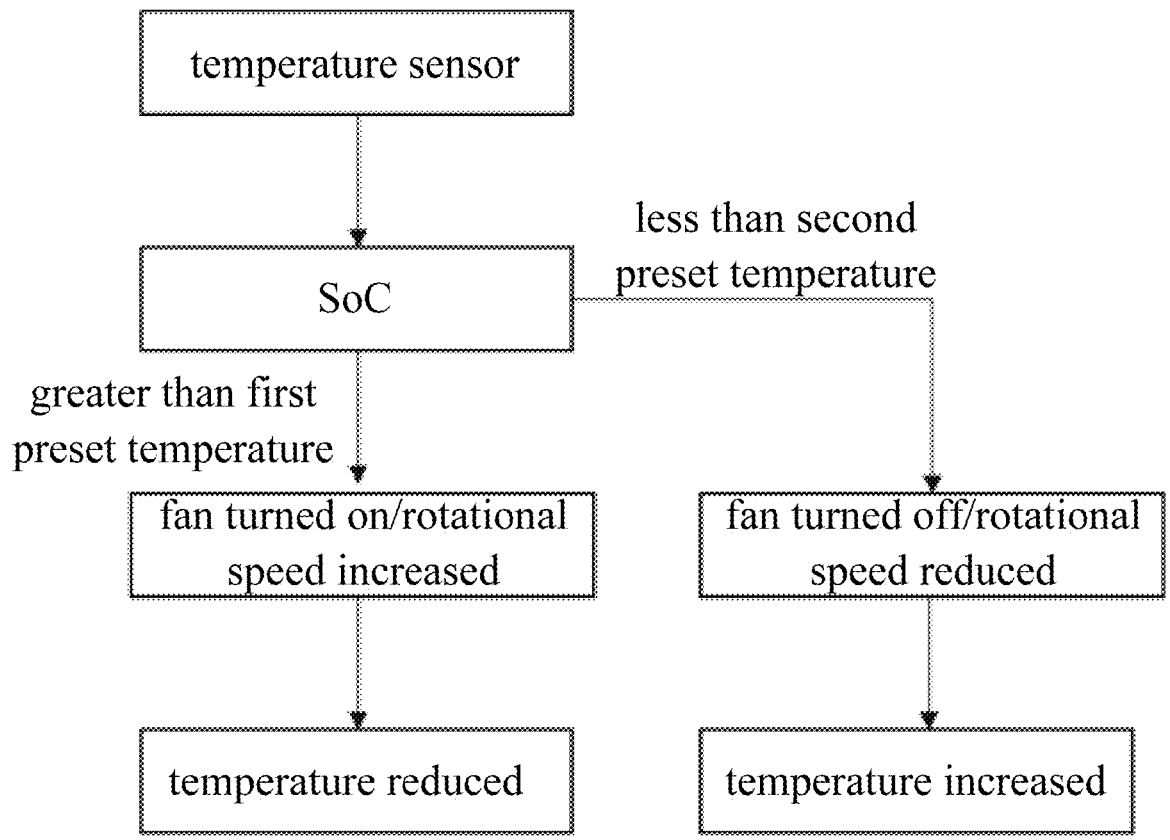
FIG. 13 schematically shows a schematic diagram of a driving method for the backlight module.

The driving relation will be described by taking the case as an example in which the heat dissipating unit comprises a fan, the temperature monitoring unit may comprise a temperature sensor, and the primary driving module comprises an SOC (System on Chip). Referring to FIG. 13, the temperature sensor collects the environmental temperature, and sends the environmental-temperature information to the SOC. The SOC receives the environmental-temperature information, and performs determination and comparison. If the environmental temperature exceeds the first preset temperature, the SOC sends the first controlling signal to the fan, and the fan, after receiving the first controlling signal, is turned on or increases the rotational speed. If the environmental temperature is less than the second preset temperature, the SOC sends the second controlling signal to the fan, and the fan, after receiving the second controlling signal, is turned off or reduces the rotational speed.

Optionally, the preset range is −0.002~+0.002. The variation value of the white-dot chromaticity coordinate of the displaying module within the compensation time duration is within the preset range, which is the same as the variation range of conventional liquid-crystal displaying modules, which ensures the chromaticity and the stability of the frame effect from the beginning of the starting-up to the stable operation.

Optionally, in order to expand the range of the adaptability of the product, the primary driving module is further configured for predetermining a plurality of compensation-driving functions, wherein the compensation-driving functions correspond to different environmental temperatures.

Because, at different environmental temperatures, the temperature-rise behaviors are different to a certain extent, it is required to provide different compensation-driving functions for the different environmental temperatures, thereby ensuring that, at all of the different environmental temperatures, the backlight module can realize the chromaticity compensation.

Further optionally, the environmental temperatures corresponding to the plurality of compensation-driving functions are ordered sequentially from a lower environmental temperature to a higher environmental temperature, and the range of the absolute values of the differences between neighboring environmental temperatures is 3~7° C. As an example, one time of the measurement may be performed every other 5° C. It should be noted that, if the actual environmental temperature and the temperature corresponding to the preset compensation-driving function are unequal, for example, the actual environmental temperature is 34° C. and the temperatures corresponding to the plurality of compensation-driving functions are 25° C., 30° C., 35° C. and so on, then the compensation-driving function corresponding to 35° C., which is the closest to 34° C., is used for the compensation.

Figure 14:
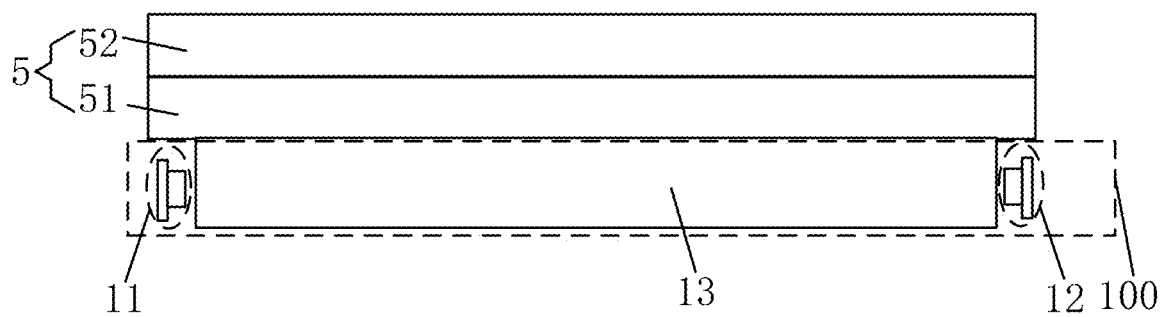
FIG. 14 schematically shows a schematic structural diagram of a displaying module.

An embodiment of the present application further provides a displaying module. Referring to FIG. 14, the displaying module comprises a display panel 5 and the backlight module 100 stated above, and the backlight module 100 is provided on the shadow side of the display panel 5.

The backlight module is configured for providing a backlight to the display panel. FIG. 5 illustrates by taking a side-incident-type backlight module as an example. Certainly, the side-incident-type backlight module may further comprise other components, and FIG. 5 merely schematically illustrates the white-light source 11, the compensating light source 12 and the light guide plate 13. The particular structure of the display panel is not limited. Referring to FIG. 5, the display panel may comprise an array base plate 51 and a color-film base plate 52 that face each other, and, certainly, may further comprise other components, which is not described in detail herein, and may particularly refer to the related art.

The type of the displaying module is not limited, and it may be liquid-crystal displaying devices such as the TN (Twisted Nematic) type, the VA (Vertical Alignment) type, the IPS (In-Plane Switching) type and the ADS (Advanced Super Dimension Switch) type, and any products or components having a displaying function that comprise those displaying devices, such as a television set, a digital camera, a mobile phone and a tablet personal computer.

An embodiment of the present application further provides a driving method for the backlight module stated above, wherein the backlight module is applied to a displaying module, and the driving method comprises:

S1: by the primary driving module, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures.

S2: by the primary driving module, according to the selected compensation-driving function, supplying a compensation controlling signal to the compensating driving module.

S3: by the compensating driving module, acquiring the compensation controlling signal, and according to the compensation controlling signal, supplying a driving signal to the compensating light source.

S4: by the compensating light source, acquiring the driving signal, and emitting light when driven by the driving signal, whereby a variation value of a white-dot chromaticity coordinate of the displaying module within the compensation time duration is within a preset range.

In the steps, the relevant description on the components may refer to the above-described embodiments, and is not discussed herein further.

By executing the steps S1-S4, at the compensation stage, the lights of the corresponding chromaticities in the white-light source can be compensated by using the compensating light source, thereby greatly reducing the variation value of the proportion of the lights of the corresponding chromaticities caused by temperature variation, which ensures that the proportion of the lights of different colors maintains stable, greatly ameliorates the problem of chromaticity deviation of the displaying module, improves the product quality, and facilitates the performance optimization of high-brightness products. The method is simple and easy to implement, and has a high operability.

Figure 15:
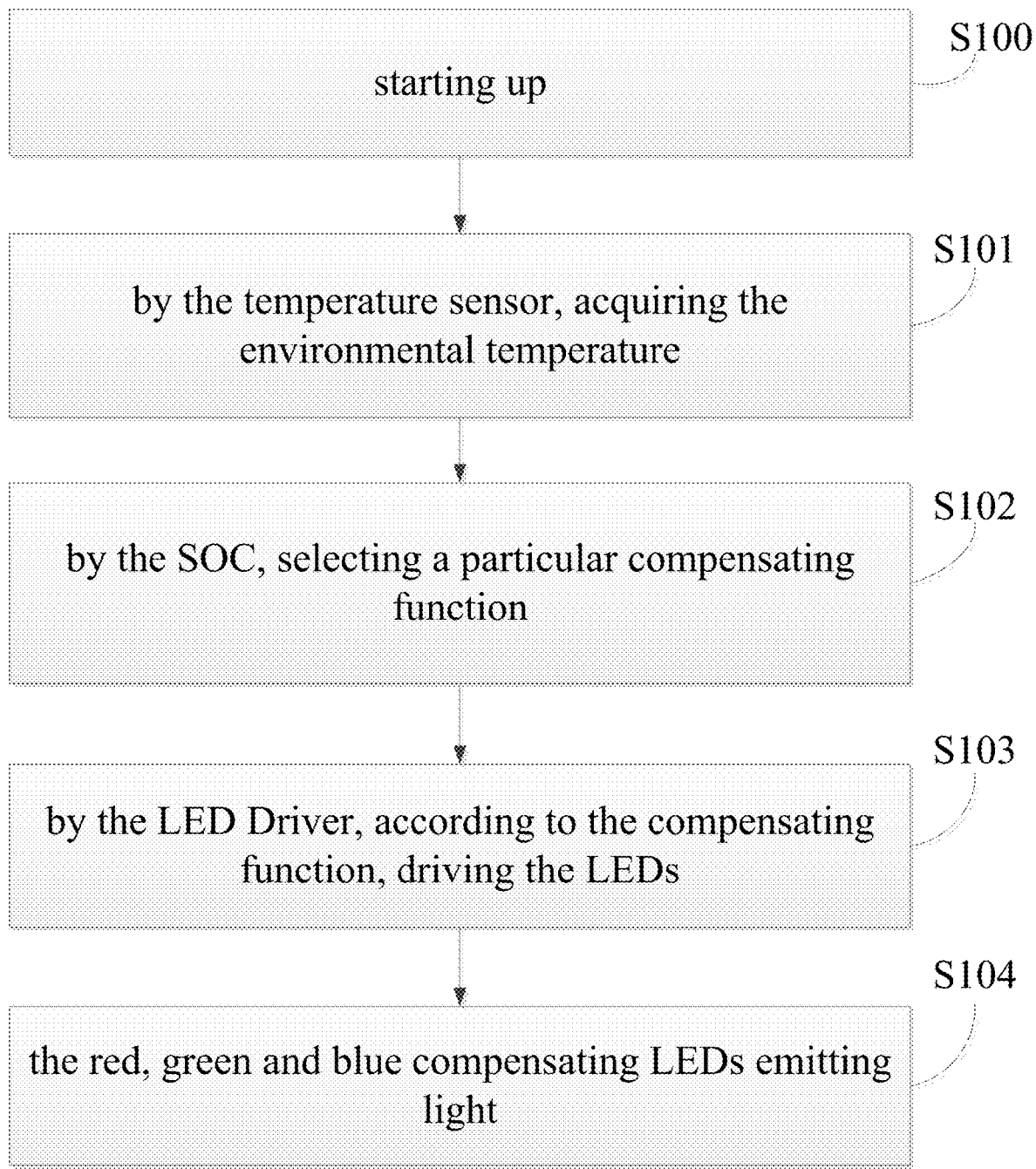
FIG. 15 schematically shows a schematic diagram of another driving method for the backlight module.

The driving method will be described by taking the case as an example in which the compensating light source comprises compensating LEDs, the temperature monitoring unit may comprise a temperature sensor, the primary driving module comprises an SOC (System on Chip) and the compensating driving module comprises an LED Driver (light-emitting-diodes driver). Referring to FIG. 15, the driving method comprises:

S100: starting up.

S101: by the temperature sensor, acquiring the environmental temperature.

S102: by the SOC, according to the environmental temperature, selecting a particular compensation-driving function.

S103: by the LED Driver, according to the compensation-driving function, driving the LEDs.

S104: the red, green and blue compensating LEDs emitting light.

Optionally, before the step S1 of, by the primary driving module, within the compensation time duration, according to the current environmental temperature, selecting the compensation-driving function corresponding to the current environmental temperature, the driving method further comprises:

S10: by the primary driving module, predetermining a plurality of instances of the compensation-driving function, wherein the compensation-driving functions correspond to different environmental temperatures.

It should be noted that the step S10 is executed before the product leaves factory, and a plurality of compensation-driving functions have already been built-in in the outgoing product.

Further optionally, the step S10 of, by the primary driving module, predetermining the plurality of instances of the compensation-driving function comprises:

S101: establishing the plurality of compensation-driving functions.

S102: placing the plurality of compensation-driving functions into the primary driving module.

Further optionally, the step S101 of establishing the compensation-driving functions comprises:

S1011: simulating a state of variation with time of a temperature of the displaying module in a room-temperature environment, to obtain a temperature-rise curve of the displaying module in the room-temperature environment.

In the step S1011, the duration required from the initial starting-up to the thermal equilibrium of the temperature (i.e., the thermal-equilibrium duration Tw) can be obtained.

S1012: simulating corresponding chromaticity values at different temperatures of the displaying module, to obtain a first relation curve between the temperatures and the chromaticity values of the displaying module.

S1013: according to a maximum chromaticity variation value, determining a type and a driving mode of the compensating light source, to obtain a second relation curve between the chromaticity values of the displaying module and electric currents of the compensating light source.

The maximum chromaticity variation value refers to the difference between the maximum value and the minimum value of the white-dot chromaticity coordinate x within the time duration from the initial starting-up to the thermal equilibrium, and the difference between the maximum value and the minimum value of the chromaticity coordinate y within the time duration from the initial starting-up to the thermal equilibrium.

The compensating light source may include a monochromatic light source, for example, a blue-light source, a red-light source or a green-light source. Alternatively, the compensating light source may also include a dichromatic light source, for example, a blue-light source and a red-light source. Alternatively, the compensating light source may also include a trichromatic light source, for example, a blue-light source, a red-light source and a green-light source.

The driving mode may be PWM driving or DC driving, which is not limited herein. The PWM driving controls the screen to alternately flicker at a certain frequency, and utilizes the visual persistence effect of human eyes to reach the effect of continuous displaying. In short, the PWM light regulation refers to continuous alternation of turning-on, turning-off, turning-on, turning-off and so on, and changing the LED brightness by changing the alternation duration. The DC driving controls the LED displaying brightness by regulating the LED voltage or current, i.e., by changing the power.

S1014: according to the first relation curve and the second relation curve, determining a pre-correction compensation-driving function.

The particular method of the determination may be obtained by referring to the related art, and is not discussed herein further.

S1015: according to actually measured data, correcting the pre-correction compensation-driving function, to obtain the compensation-driving function corresponding to the room-temperature environment.

Figure 16:
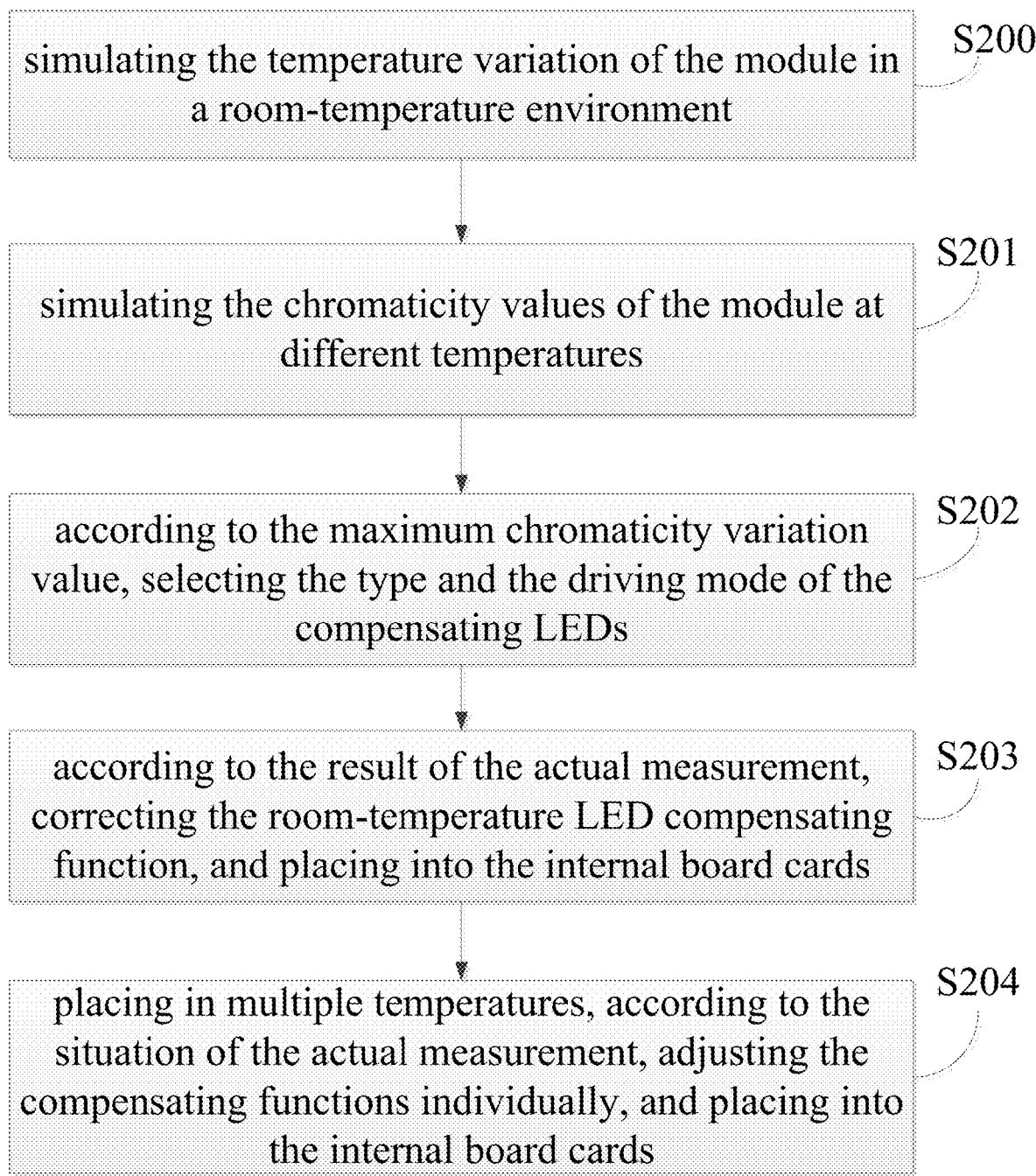
FIG. 16 schematically shows a flow chart of the establishing of a compensation-driving function.

It should be noted that, after the steps S1011-S1015 have been executed, merely the compensation-driving function corresponding to the room-temperature environment can be obtained. The steps of establishing the compensation-driving functions corresponding to other environmental temperatures may refer to the steps S1011-S1015, and are not discussed herein further. FIG. 16 is a simplified flow chart of the complete establishing steps of the step S101. Referring to FIG. 16, by executing the steps S200-S204, a plurality of compensation-driving functions can be placed into the board cards of the primary driving module.

In one or more embodiments, the backlight module further comprises a temperature monitoring unit.

Before the step S1 of, by the primary driving module, within the compensation time duration, according to the current environmental temperature, selecting the compensation-driving function corresponding to the current environmental temperature, the driving method further comprises:

S5: by the temperature monitoring unit, within the compensation time duration, collecting an environmental temperature and transmitting an environmental-temperature information to the primary driving module.

The temperature monitoring unit may comprise a temperature sensor. It should be noted that, if the displaying module comprises the heat dissipating unit, the temperature monitoring unit may also collect the environmental temperature continuously beyond the compensation time duration, to facilitate the primary driving module to control the heat-dissipation power of the heat dissipating unit. The method and the time quantity of the collection by the temperature monitoring unit beyond the compensation time duration are not limited. As an example, the collection may be performed in real time, or the collection may be performed with a certain time interval, which may be particularly selected according to situations.

S6: by the primary driving module, acquiring the environmental-temperature information.

By executing the steps S5-S6, the primary driving module can obtain the current environmental temperature.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A backlight module, wherein the backlight module is applied to a displaying module;
   the backlight module comprises a backlight source and a backlight driving unit;
   the backlight source comprises a white-light source and a compensating light source, an exiting-light-wavelength range of the white-light source is a first wavelength range, and an exiting-light-wavelength range of the compensating light source is a second wavelength range, wherein the second wavelength range is within the first wavelength range;
   the backlight driving unit comprises a primary driving module and a compensating driving module, wherein the primary driving module is a System on Chip, the compensating driving module is a compensating driving chip, and the compensating driving chip is a single chip microcomputer, an Advanced RISC Machine or a Field Programmable Gate Array;
   the primary driving module is electrically connected to the white-light source and the compensating driving module, and is configured for, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures; and according to the selected compensation-driving function, supplying a compensation controlling signal to the compensating driving module;
   the compensating driving module is configured for acquiring the compensation controlling signal, and according to the compensation controlling signal, supplying a driving signal to the compensating light source; and
   the compensating light source is configured for acquiring the driving signal, and emitting light when driven by the driving signal, whereby a variation value of a white-dot chromaticity coordinate of the displaying module within the compensation time duration is within a preset range;
   wherein a working efficiency η of the compensating light source satisfies:

$$\eta = 100\% * \left(1 - \frac{t}{T_w} * A\right) , t \leq T_w$$
$$\eta = 0 \qquad\qquad\qquad , t > T_w$$

wherein t represents a duration, Tw is a thermal-equilibrium duration of the displaying module, and A is a module impact factor.

2. The backlight module according to claim 1, wherein the compensating light source comprises a blue-light source; or
   the compensating light source comprises a blue-light source and a red-light source; or
   the compensating light source comprises a red-light source, a green-light source and a blue-light source.

3. The backlight module according to claim 1, wherein the compensating light source comprises a red-light source, a green-light source and a blue-light source; and
   a white-dot chromaticity coordinate (x,y) of the displaying module within the compensation time duration when the white-light source and the compensating light source are started up and a white-dot chromaticity coordinate $(x_0,y_0)$ of the displaying module within the compensation time duration when the white-light source is started up and the compensating light source is not started up satisfy:

$$x = x_0 + \emptyset_R * \delta_R + \emptyset_G * \delta_G + \emptyset_B * \delta_B$$
$$y = y_0 + \emptyset_R * \sigma_R + \emptyset_G * \sigma_G + \emptyset_B * \sigma_B$$

wherein $\emptyset_R$, $\emptyset_G$ and $\emptyset_B$ are respectively a ratio of an intensity of the red-light source to an intensity of the white-light source, a ratio of an intensity of the green-light source to the intensity of the white-light source, and a ratio of an intensity of the blue-light source to the intensity of the white-light source, $\delta_R$, $\delta_G$ and $\delta_B$ are respectively impact factors of a red light, a green light and a blue light to an x chromaticity coordinate, and $\sigma_R$, $\sigma_G$ and $\sigma_B$ are respectively impact factors of the red light, the green light and the blue light to a y chromaticity coordinate;
wherein $0 \leq \varnothing_R \leq 10\%, 0 \leq \varnothing_G \leq 10\%$, and $0 \leq \varnothing_B \leq 10\%$;

$0.0758R \leq \delta_R \leq 0.2, -0.258G \leq \delta_G \leq 0.2$, and $-0.08 \leq \delta_B \leq -0.01$; and $-0.012 \leq \sigma_R \leq -0.005, 0.15 \leq \sigma_G \leq 0.0$, and $-0.02 \leq \sigma_B \leq -0.07$.

4. The backlight module according to claim 1, wherein the backlight module further comprises a light guide plate, and the white-light source and the compensating light source are placed on two opposite sides of the light guide plate.

5. The backlight module according to claim 1, wherein the backlight module further comprises a diffusing plate and a reflector plate, the white-light source and the compensating light source are provided between the diffusing plate and the reflector plate, and the compensating light source is provided at a periphery of the white-light source.

6. The backlight module according to claim 1, wherein the white-light source comprises a plurality of white-light emitting units, the compensating light source comprises a plurality of compensating light emitting units, and a quantity of the compensating light emitting units is less than a quantity of the white-light emitting units.

7. The backlight module according to claim 1, wherein the backlight module further comprises a temperature monitoring unit, and the temperature monitoring unit is electrically connected to the primary driving module;
the temperature monitoring unit is configured for, within the compensation time duration, collecting an environmental temperature and transmitting an environmental-temperature information to the primary driving module; and
the primary driving module is further configured for acquiring the environmental-temperature information.

8. The backlight module according to claim 7, wherein the backlight module further comprises a heat dissipating unit, and the heat dissipating unit is electrically connected to the primary driving module, wherein the heat dissipating unit is a fan;
the primary driving module is further configured for, in response to the environmental temperature being greater than a first preset temperature, transmitting a first controlling signal to the heat dissipating unit, wherein the first preset temperature is less than a thermal-equilibrium temperature of the displaying module; and
the heat dissipating unit is configured for, according to the first controlling signal transmitted by the primary driving module, starting up or increasing a heat-dissipation power.

9. The backlight module according to claim 8, wherein the primary driving module is further configured for, in response to the environmental temperature being less than a second preset temperature, transmitting a second controlling signal to the heat dissipating unit, wherein the second preset temperature is less than the first preset temperature; and
the heat dissipating unit is configured for, according to the second controlling signal transmitted by the primary driving module, shutting down or reducing the heat-dissipation power.

10. The backlight module according to claim 1, wherein the preset range is −0.002~+0.002.

11. The backlight module according to claim 1, wherein the primary driving module is further configured for predetermining a plurality of instances of the compensation-driving function, wherein the compensation-driving functions correspond to different environmental temperatures;
wherein the environmental temperatures corresponding to the plurality of compensation-driving functions are ordered sequentially from a lower environmental temperature to a higher environmental temperature, and a range of absolute values of differences between neighboring instances of the environmental temperatures is 3~7° C.

12. A displaying module, wherein the displaying module comprises a display panel and the backlight module according to claim 1, and the backlight module is provided on a shadow side of the display panel.

13. A driving method for the backlight module according to claim 1, wherein the driving method comprises:
by the primary driving module, within the compensation time duration, according to the current environmental temperature, selecting the compensation-driving function corresponding to the current environmental temperature;
by the primary driving module, according to the selected compensation-driving function, supplying the compensation controlling signal to the compensating driving module;
by the compensating driving module, acquiring the compensation controlling signal, and according to the compensation controlling signal, supplying the driving signal to the compensating light source; and
by the compensating light source, acquiring the driving signal, and emitting the light when driven by the driving signal.

14. The driving method according to claim 13, wherein before the step of, by the primary driving module, within the compensation time duration, according to the current environmental temperature, selecting the compensation-driving function corresponding to the current environmental temperature, the driving method further comprises:
by the primary driving module, predetermining a plurality of instances of the compensation-driving function, wherein the compensation-driving functions correspond to different environmental temperatures.

15. The driving method according to claim 14, wherein the step of, by the primary driving module, predetermining the plurality of instances of the compensation-driving function comprises:
establishing the plurality of compensation-driving functions; and
placing the plurality of compensation-driving functions into the primary driving module.

16. The driving method according to claim 15, wherein the step of establishing the compensation-driving functions comprises:
simulating a state of variation with time of a temperature of the displaying module in a room-temperature environment, to obtain a temperature-rise curve of the displaying module in the room-temperature environment;
simulating corresponding chromaticity values at different temperatures of the displaying module, to obtain a first relation curve between the temperatures and the chromaticity values of the displaying module;

according to a maximum chromaticity variation value, determining a type and a driving mode of the compensating light source, to obtain a second relation curve between the chromaticity values of the displaying module and electric currents of the compensating light source;

according to the first relation curve and the second relation curve, determining a pre-correction compensation-driving function; and according to actually measured data, correcting the pre-correction compensation-driving function, to obtain the compensation-driving function corresponding to the room-temperature environment.

17. The driving method according to claim 13, wherein the backlight module further comprises a temperature monitoring unit; and before the step of, by the primary driving module, within the compensation time duration, according to the current environmental temperature, selecting the compensation-driving function corresponding to the current environmental temperature, the driving method further comprises:

by the temperature monitoring unit, within the compensation time duration, collecting an environmental temperature and transmitting an environmental-temperature information to the primary driving module; and by the primary driving module, acquiring the environmental-temperature information.

18. A backlight module, wherein the backlight module is applied to a displaying module;

the backlight module comprises a backlight source and a backlight driving unit;

the backlight source comprises a white-light source and a compensating light source, an exiting-light-wavelength range of the white-light source is a first wavelength range, and an exiting-light-wavelength range of the compensating light source is a second wavelength range, wherein the second wavelength range is within the first wavelength range;

the backlight driving unit comprises a primary driving module and a compensating driving module, wherein the primary driving module is a System on Chip, the compensating driving module is a compensating driving chip, and the compensating driving chip is a single chip microcomputer, an Advanced RISC Machine or a Field Programmable Gate Array;

the primary driving module is electrically connected to the white-light source and the compensating driving module, and is configured for, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures; and according to the selected compensation-driving function, supplying a compensation controlling signal to the compensating driving module;

the compensating driving module is configured for acquiring the compensation controlling signal, and according to the compensation controlling signal, supplying a driving signal to the compensating light source; and the compensating light source is configured for acquiring the driving signal, and emitting light when driven by the driving signal, whereby a variation value of a white-dot chromaticity coordinate of the displaying module within the compensation time duration is within a preset range;

wherein the compensating light source comprises a blue-light source; and a white-dot chromaticity coordinate (x,y) of the displaying module within the compensation time duration when the white-light source and the compensating light source are started up and a white-dot chromaticity coordinate $(x_0,y_0)$ of the displaying module within the compensation time duration when the white-light source is started up and the compensating light source is not started up satisfy:

$$x = x_0 + \emptyset_B * \delta_B$$
$$y = y_0 + \emptyset_B * \sigma_B$$

wherein $\emptyset_B$ is a ratio of an intensity of the blue-light source to an intensity of the white-light source, $\delta_B$ is an impact factor of a blue light to an x chromaticity coordinate, and $\sigma_B$ is an impact factor of the blue light to a y chromaticity coordinate;

wherein $0 \leq \emptyset_B \leq 10\%$;

$-0.08 \leq \delta_B \leq -0.01$; and $-0.25 \leq \sigma_B \leq -0.07$.

19. A backlight module, wherein the backlight module is applied to a displaying module;

the backlight module comprises a backlight source and a backlight driving unit;

the backlight source comprises a white-light source and a compensating light source, an exiting-light-wavelength range of the white-light source is a first wavelength range, and an exiting-light-wavelength range of the compensating light source is a second wavelength range, wherein the second wavelength range is within the first wavelength range;

the backlight driving unit comprises a primary driving module and a compensating driving module, wherein the primary driving module is a System on Chip, the compensating driving module is a compensating driving chip, and the compensating driving chip is a single chip microcomputer, an Advanced RISC Machine or a Field Programmable Gate Array;

the primary driving module is electrically connected to the white-light source and the compensating driving module, and is configured for, within a compensation time duration, according to a current environmental temperature, selecting a compensation-driving function corresponding to the current environmental temperature, wherein the compensation time duration refers to a time duration from an initial starting-up moment of the displaying module to a thermal-equilibrium moment, and the compensation-driving function contains a correspondence relation between driving currents of the compensating light source and environmental temperatures; and according to the selected compensation-driving function, supplying a compensation controlling signal to the compensating driving module;

the compensating driving module is configured for acquiring the compensation controlling signal, and according to the compensation controlling signal, supplying a driving signal to the compensating light source; and the compensating light source is configured for acquiring the driving signal, and emitting light when driven by the driving signal, whereby a variation value of a white-dot chromaticity coordinate of the displaying module within the compensation time duration is within a preset range;

wherein the compensating light source comprises a blue-light source and a red-light source; and a white-dot chromaticity coordinate (x,y) of the displaying module within the compensation time duration when the white-light source and the compensating light source are started up and a white-dot chromaticity coordinate ($x_0$, $y_0$) of the displaying module within the compensation time duration when the white-light source is started up and the compensating light source is not started up satisfy:

$$x = x_0 + \phi_R * \delta_R + \phi_B * \delta_B$$

$$y = y_0 + \phi_R * \sigma_R + \phi_B * \sigma_B$$

wherein $\phi_R$ and $\phi_B$ are respectively a ratio of an intensity of the red-light source to an intensity of the white-light source and a ratio of an intensity of the blue-light source to the intensity of the white-light source, $\delta_R$ and $\delta_B$ are respectively impact factors of a red light and a blue light to an x chromaticity coordinate, and OR and OB are respectively impact factors of the red light and the blue light to a y chromaticity coordinate;

wherein $0 \leq \phi_B \leq 10\%$, and $0 \leq \phi_R \leq 10\%$;

$-0.08 \leq \delta_B \leq -0.01$, and $0.07 \leq \delta_R \leq 0.2$; and $-0.2 \leq \sigma_B \leq -0.07$, and $-0.012 \leq \sigma_R \leq -0.005$.

* * * * *